Dec. 12, 1961 W. J. RUSSELL 3,012,686
VACUUM BOTTLE

Filed April 11, 1958 2 Sheets-Sheet 1

INVENTOR.
WILLIAM J. RUSSELL
BY
Lindsey and Prutzman
ATTORNEYS

Dec. 12, 1961 W. J. RUSSELL 3,012,686
VACUUM BOTTLE
Filed April 11, 1958 2 Sheets-Sheet 2

INVENTOR.
WILLIAM J. RUSSELL
BY
*Lindsey and Prutzman*
ATTORNEYS

# United States Patent Office 3,012,686
Patented Dec. 12, 1961

3,012,686
VACUUM BOTTLE
William J. Russell, Kensington, Conn., assignor to Landers, Frary and Clark, New Britain, Conn., a corporation of Connecticut
Filed Apr. 11, 1958, Ser. No. 728,000
2 Claims. (Cl. 215—13)

This invention relates to vacuum bottles and is concerned, more particularly, with a novel and improved casing construction for vacuum bottles providing increased utility and greater resistance to shock.

An aim of the present invention is to provide a casing for vacuum bottles which combines the advantages of metal and non-metallic elements and in which the glass bottle or filler is entirely supported in an improved manner by resilient non-metallic parts to provide maximum cushioning and minimize breakage. Included in this aim is the provision of an improved structure wherein the spout portion is securely locked to the body of the casing and does not come apart from the body, the glass bottle or filler being removable from the bottom end.

A further aim is to provide a vacuum bottle of improved appearance and utility which can be fabricated and assembled in an economical and convenient manner to provide a rugged structure which will withstand hard usage and which will provide proper cushioning of the glass bottle or filler despite substantial dimensional variations in the latter which are difficult to control within close limits and tolerances.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
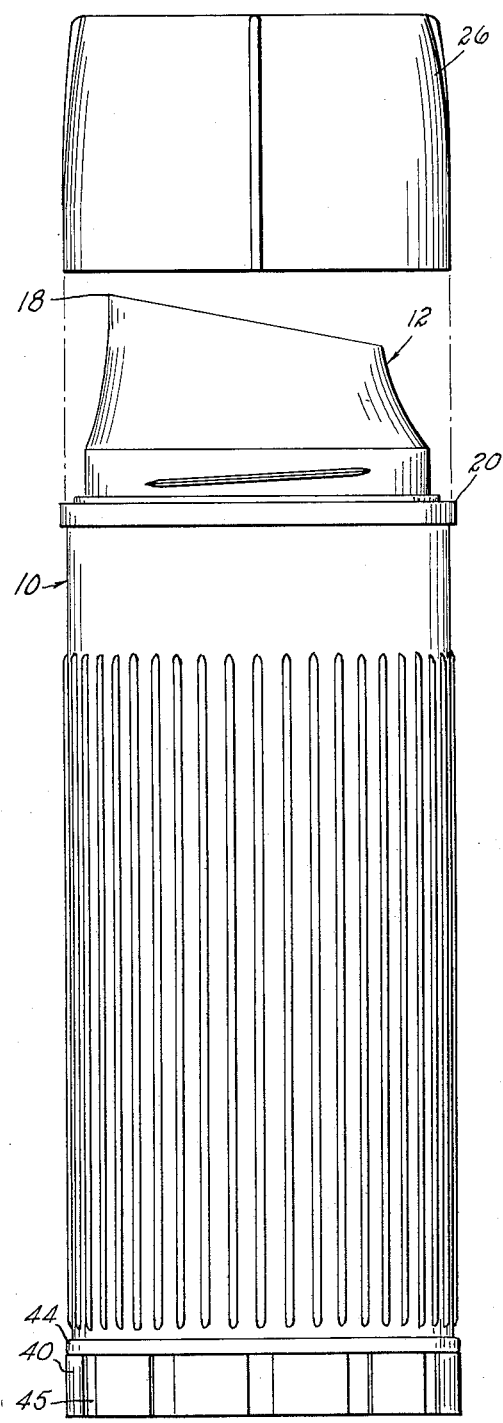
FIG. 1 is an elevational view of a vacuum bottle constructed in accordance with the invention with the cap thereof separated from the remainder of the assembly.

Referring to the drawings, the main body portion of the casing comprises a metal tube 10 which is preferably fluted or ridged as shown in FIG. 1 to minimize slippage when the same is handled. Permanently fixed to the upper end of the tube 10 is a spout portion 12 which is preferably molded of plastic material and which is heat sealed to the tube 10.

Figure 2:
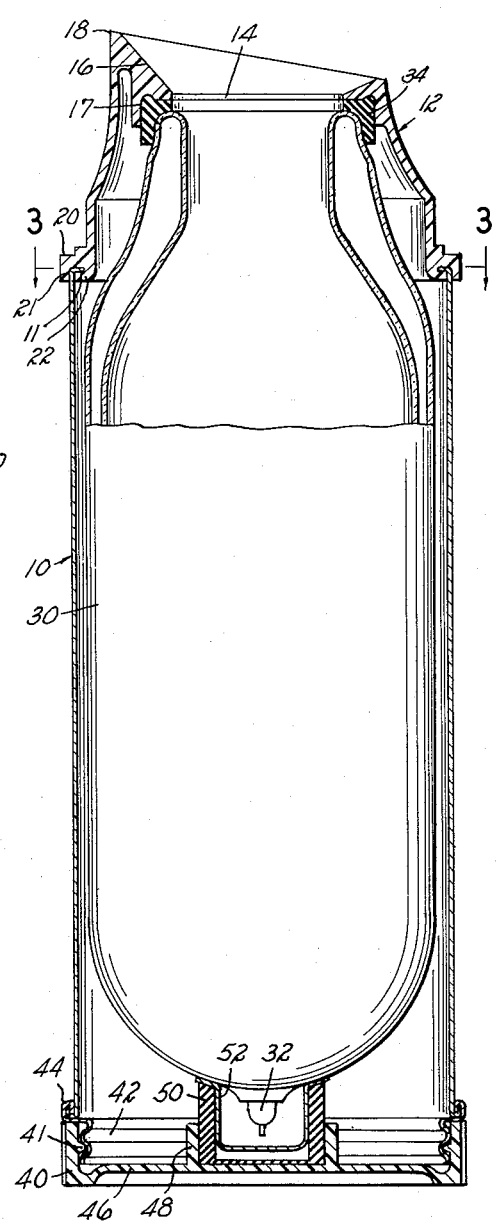
FIG. 2 is a fragmentary cross sectional view of the vacuum bottle of FIG. 1.
Figure 3:
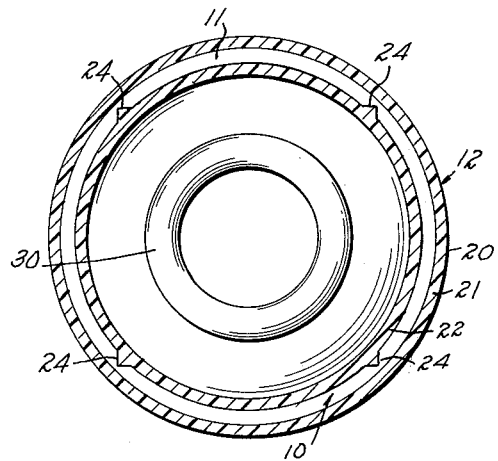
FIG. 3 is a cross sectional view substantially along the line 3—3 of FIG. 2.
Figure 4:
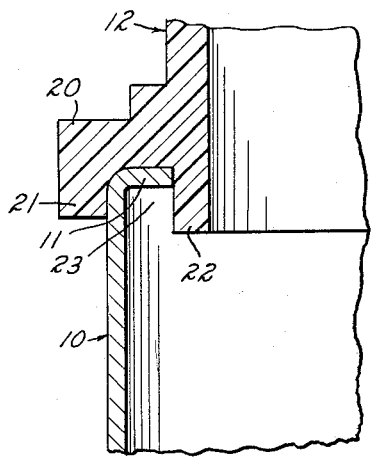
FIG. 4 is an enlarged fragmentary view of a portion of the vacuum bottle showing the configuration prior to assembly.

As best shown in FIG. 2, the spout portion 12 is generally of inverted cup shape having a central pouring opening 14 defined by a lip 16 of enlarged cross-section and molded to form the pouring spout 18. The bottom edge of the spout portion 12 is formed with a stepped shoulder 20 which initially is formed with a depending flange 22 defining with the rim 21 a groove 23 for receiving the inturned edge 11 at the upper end of the tube 10. The edge 11 preferably is formed with a number of indentations or notches 24 as best shown in FIG. 3. After the spout portion 12 has been placed on the upper end of the tube 12 as shown in FIG. 4, a heated forming tool may be inserted through the bottom end of the tube 11 to seal the spout portion 12 to the tube, the flange 22 being deformed outwardly and upwardly as shown in FIG. 2 to embed the edge 11 and fill the indentations 24 and thus securely join the spout portion 12 to the tube 10 in sealed relationship, thus preventing turning or separation of the parts. A removable cap 26 may be provided to threadedly engage on the spout portion and seat on the shoulder 20 to enclose and protect the spout portion.

The glass bottle or filler 30 which is a conventional double wall container made of glass and having a characteristic bottom tip 32 produced in the usual manufacturing process, is inserted into the tube 10 through the bottom opening thereof and engages at its upper end against an annular resilient cushion 34 formed of rubber or the like which is cemented in a groove 17 formed in the lip 16. Thus, the upper end of the glass bottle abuts against only the cushion 34 which under compression forms a seal therewith and also centers the upper end of the bottle.

The lower end of the tube 10 is closed by a cap 40 preferably molded from plastic material and formed with internal threads 41. While the lower end of the tube 10 may be threaded for reception of the cap 40, the specific embodiment is shown provided with a threaded extension 42 for this purpose which is permanently joined to the bottom of the tube 10 by rolling over the adjoining edges as shown at 44. Ribs 45 may be formed on the periphery of the cap to make it easier to grasp and turn the same.

The cap 40 is formed with a transverse bottom wall 46 having a central cylindrical boss 48 in which is inserted a resilient cup-shaped bushing 50 formed of rubber or the like. The upper edge of the bushing 50 encompasses the tip 32 and engages the bottom of the filler 30 to support the same. In the specific embodiment, a protective metal cap 52 has been cemented to the filler 30 to enclose the tip 32 and also assist in centering the filler 30 on the bushing 50.

An important feature of the invention is that the bottom wall 46 of the cap 40 is formed of thin cross-section which in relationship to its diameter, is such that when the cap 40 is turned in to secure the filler 30 in place, it will flex and resiliently apply a preselected pressure to the bushing 50 and hence the bottom of the filler 30. This is important because of variations in the length of the glass fillers 30 which cannot be maintained within close limits and tolerances. Thus, regardless of the usual variations in the length of the glass fillers 30, the same will be seated in the bottle with desired holding pressure and yet without exceeding a pressure at which the proper resilient support is obtained.

As will be apparent from the above description, the improved casing for a vacuum bottle of the present invention combines the advantages of a metal body portion with a plastic spout portion and since these are permanently joined, it is impossible to disassemble the same inadvertently which frequently occurs with conventional casings when the cap is removed. The assembly and disassembly of the vacuum bottle by means of a removable bottom cap facilitates the removal and insertion of the filler 30 and obviates the need for a removable spout portion as generally used heretofore. Also, it will be noted that the glass bottle or filler 30 is entirely supported on resilient non-metallic parts and that the use of metal supports is avoided to provide maximum resiliency and cushioning with consequent reduction in breakage. The casing is economical to fabricate and assemble and provides a pleasing appearance in addition to its structural advantages.

The specific embodiment is given by way of illustration and not limitation. Since the invention will be susceptible of variation and modification by one skilled in the art, all such variations and modifications are intended to be included within the scope of the invention.

I claim:
1. A vacuum bottle assembly comprising a metallic casing having a tubular body with a radially extending flange at one end, said flange having a plurality of indentations; an integrally molded spout of thermoplastic resinous material having a pouring portion and a body portion, said body portion having a pair of circular spaced-apart flanges depending therefrom with the flange on the casing extending therebetween, one of said flanges extending under the flange on the casing and the body portion of the spout extending into and being engaged within each of the indentations of said casing flange to prevent longitudinal separation and relative rotation of the spout and casing; a glass filler in said casing having its neck portion in proximity to the pouring portion of said spout; an annular resilient cushion of rubber-like material disposed between the neck of said filler and the pouring portion of said spout; a removable integrally formed plastic closure for the other end of the casing having a flexible transverse wall and an upstanding peripheral flange removably engaged with said casing; an annular resilient cushion of rubber-like material seated on the central portion of the transverse wall of said closure and the base portion of said filler; and a tip protector secured to the base portion of the filler and seated in said annular resilient cushion to prevent movement radially of the casing, said cushions supporting the glass filler therebetween in spaced relationship with said casing, said spout, casing and closure being dimensioned to exert a predetermined pressure on said cushions to resiliently hold said glass filler, and said first-mentioned cushion being compressed to provide a liquid-tight seal between the neck of said filler and the pouring portion of said spout.

2. A vacuum bottle assembly comprising a metallic casing having a cylindrical body with a radially extending flange, at one end, said flange having a plurality of indentations; an integrally molded spout of rigid plastic resinous material having a pouring lip portion with an inwardly tapering centrally disposed circular aperture therein and a body portion, said body portion having a pair of circular spaced-apart flanges depending therefrom with the flange on the casing extending therebetween, one of said flanges extending under the flange and the body portion extending into and being engaged within each of the indentations of said casing flange to prevent longitudinal separation and relative rotation of the spout portion and casing; a cylindrical glass filler in said casing having its neck portion in proximity to the pouring lip portion of said spout with the circular aperture of the neck portion coaxial with the aperture in the lip portion; an annular resilient cushion of rubber-like material disposed between the neck of said filler and the pouring portion of said spout, said cushion having an opening therein coaxial with and substantially equal to the aperture of the pouring lip and coaxial with the aperture of the neck portion of said filler; an integrally formed plastic closure having a thin, flexible transverse wall, an upstanding peripheral flange threadably engaged with the metallic casing and a centrally disposed cylindrical boss on said transverse wall; a resilient annular bushing of rubber-like material disposed within said boss and supporting the base portion of said filler, said cushion and bushing supporting said filler in spaced relationship from the casing; and a tip protector secured to the base portion of said filler and seated in said annular bushing to prevent movement of the filler radially of the casing, said spout, casing and closure being dimensioned to exert a predetermined pressure on said cushion and bushing to resiliently hold said filler, and said cushion being axially compressed to provide a liquid-tight seal between the neck of the filler and the pouring portion of the spout.

References Cited in the file of this patent

UNITED STATES PATENTS

| | | |
|---|---|---|
| 1,995,256 | Raworth | Mar. 19, 1935 |
| 2,274,258 | Roselle | Feb. 24, 1942 |
| 2,364,234 | Morrell | Dec. 5, 1944 |
| 2,459,543 | Schmerheim | Jan. 18, 1949 |
| 2,476,446 | Lindell | July 19, 1949 |
| 2,534,295 | Payson et al. | Dec. 19, 1950 |
| 2,644,578 | Bramming | July 7, 1953 |
| 2,756,889 | Bramming | July 31, 1956 |
| 2,817,452 | Bramming | Dec. 24, 1957 |